United States Patent [19]

Okada et al.

[11] Patent Number: 5,896,090
[45] Date of Patent: Apr. 20, 1999

[54] OCCUPANT SENSING APPARATUS

[75] Inventors: Shoji Okada, Anjo; Toshimitsu Oka, Okazaki; Naofumi Fujie, Nagoya, all of Japan

[73] Assignee: Aisin Seiki Kabushiki Kaisha, Japan

[21] Appl. No.: 08/864,075

[22] Filed: May 28, 1997

[30] Foreign Application Priority Data

May 29, 1996 [JP] Japan ................................ 8-135504

[51] Int. Cl.$^6$ ................................................ G08B 21/00
[52] U.S. Cl. ................................ 340/667; 200/85 A
[58] Field of Search ................................ 340/667, 666; 200/61.58 R, 85 A, DIG. 35, 512

[56] References Cited

U.S. PATENT DOCUMENTS

| 4,276,538 | 6/1981 | Eventoff et al. | 338/69 |
|---|---|---|---|
| 4,301,337 | 11/1981 | Eventoff | 200/5 A |
| 4,314,227 | 2/1982 | Eventoff | 338/99 |
| 4,314,228 | 2/1982 | Eventoff | 338/114 |
| 4,315,238 | 2/1982 | Eventoff | 338/99 |
| 4,401,896 | 8/1983 | Fowler et al. | 340/666 |
| 5,232,243 | 8/1993 | Blackburn et al. | 280/732 |
| 5,330,226 | 7/1994 | Gentry et al. | 280/735 |

FOREIGN PATENT DOCUMENTS

| 2-49029 | 10/1990 | Japan. |
| 6-206514 | 7/1994 | Japan. |
| 8-10800 | 3/1996 | Japan. |

OTHER PUBLICATIONS

Concise English explanation of Japanese Utility Model Publication No. 8–10800 (1 page).

*Primary Examiner*—Glen Swann
*Attorney, Agent, or Firm*—Finnegan Henderson Farabow Garrett & Dunner, L.L.P.

[57] ABSTRACT

An occupant sensing apparatus for detecting a seated person on a seat includes a pressure switch disposed in the seat. The pressure switch has a pair of films and a pair of electrodes disposed between the films. The pair of electrodes are spaced in the films so as to define an OFF condition of the pressure switch. The pressure switch is in an ON condition when the electrodes contact each other. The occupant sensing apparatus further includes a controller connected to the electrodes of the pressure switch and determining whether the seat is occupied in accordance with the ON or OFF condition of the pressure switch.

11 Claims, 6 Drawing Sheets

5,896,090

OCCUPANT SENSING APPARATUS

BACKGROUND OF THE INVENTION

1. Field of the Invention

The present invention generally relates to an occupant sensing apparatus for detecting a seated person on a seat.

2. Description of the Related Art

An example of an occupant sensing apparatus is disclosed in U.S. Pat. No. 5,232,243.

The occupant sensing apparatus includes a piezoelectric film sensor and a controller. The piezoelectric film sensor is disposed in a seat and is oscillated by a driving circuit. The controller is connected to the piezoelectric film sensor and monitors an oscillation value of the piezoelectric film sensor. When a person is seated on the seat, the piezoelectric film sensor contacts a contacting arm of the seat. Therefore, the oscillation value of the piezoelectric film sensor is attenuated. As a result, the controller determines a seated condition of the seat in accordance with the oscillation value of the piezoelectric film sensor.

However, the occupant sensing apparatus needs the driving circuit for oscillating the piezoelectric film sensor. Also, the piezoelectric film sensor is expensive. Therefore, the detecting apparatus becomes complicated and expensive.

SUMMARY OF THE INVENTION

The advantages and purpose of the invention will be set forth in part in the description which follows, and in part will be obvious from the description, or may be learned by practice of the invention. The advantages and purpose of the invention will be realized and attained by the elements and combinations particularly pointed out in the appended claims.

To attain the advantages and in accordance with the purpose of the invention, as embodied and broadly described herein, the invention comprises an occupant sensing apparatus for detecting a seated person on a seat, including a pressure switch disposed in the seat. The pressure switch has a pair of films and a pair of electrodes disposed between the films. The pair of electrodes are spaced in the films so as to define an OFF condition of the pressure switch. The pressure switch is in an ON condition when the electrodes contact each other. The occupant sensing apparatus further includes a controller connected to the electrodes of the pressure switch and determines whether the seat is occupied in accordance with the ON or OFF condition of the pressure switch.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

Figure 1:
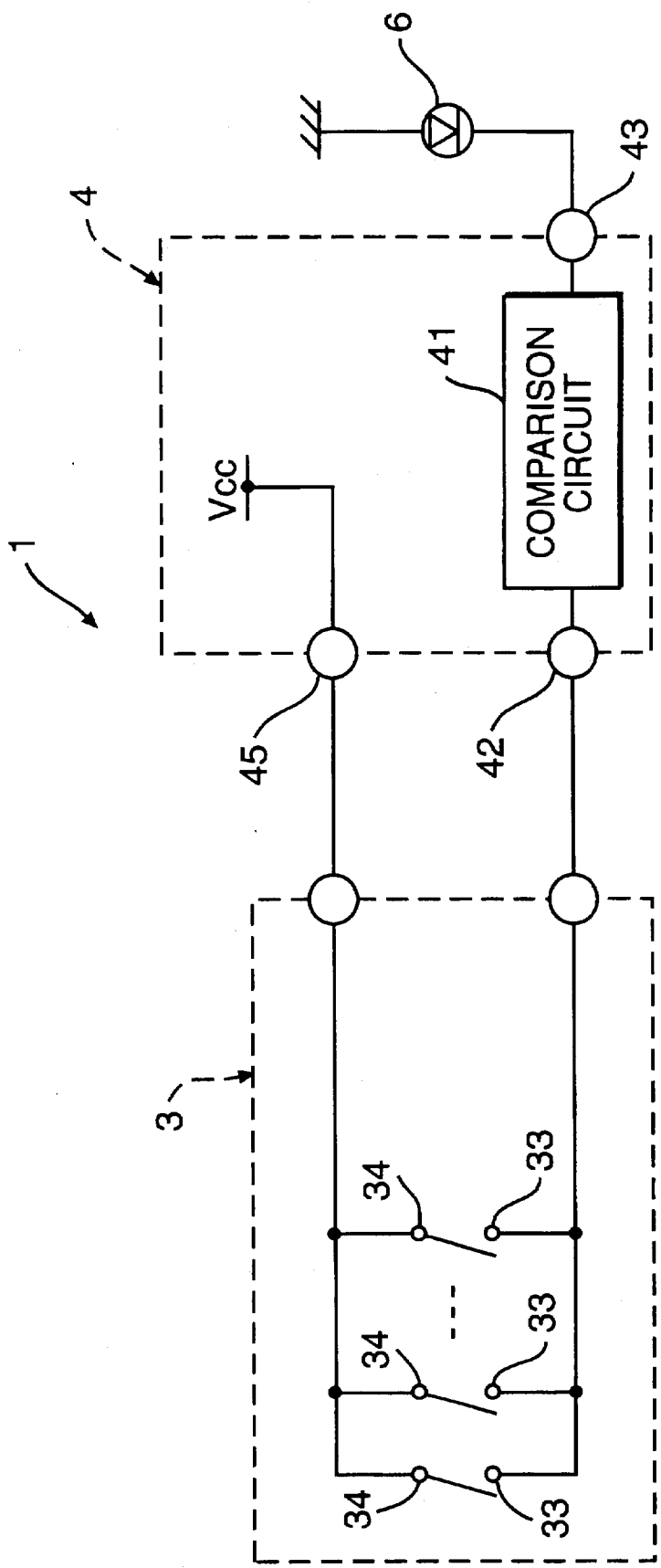
FIG. 1 is a circuit diagram depicting electrical components of the present invention.

Reference will now be made in detail to the present preferred embodiments of the invention, examples of which are illustrated in the accompanying drawings. Wherever possible, the same reference numbers will be used throughout the drawings to refer to the same or like parts.

As shown in FIGS. 1–4, the occupant sensing apparatus 1 for detecting a seated person on a vehicle seat 2 includes a pressure switch 3 and a controller 4. The pressure switch 3 is disposed in the seat cushion 5 of the seat 2. The controller 4 is mounted on the vehicle floor (not shown).

Figure 2:
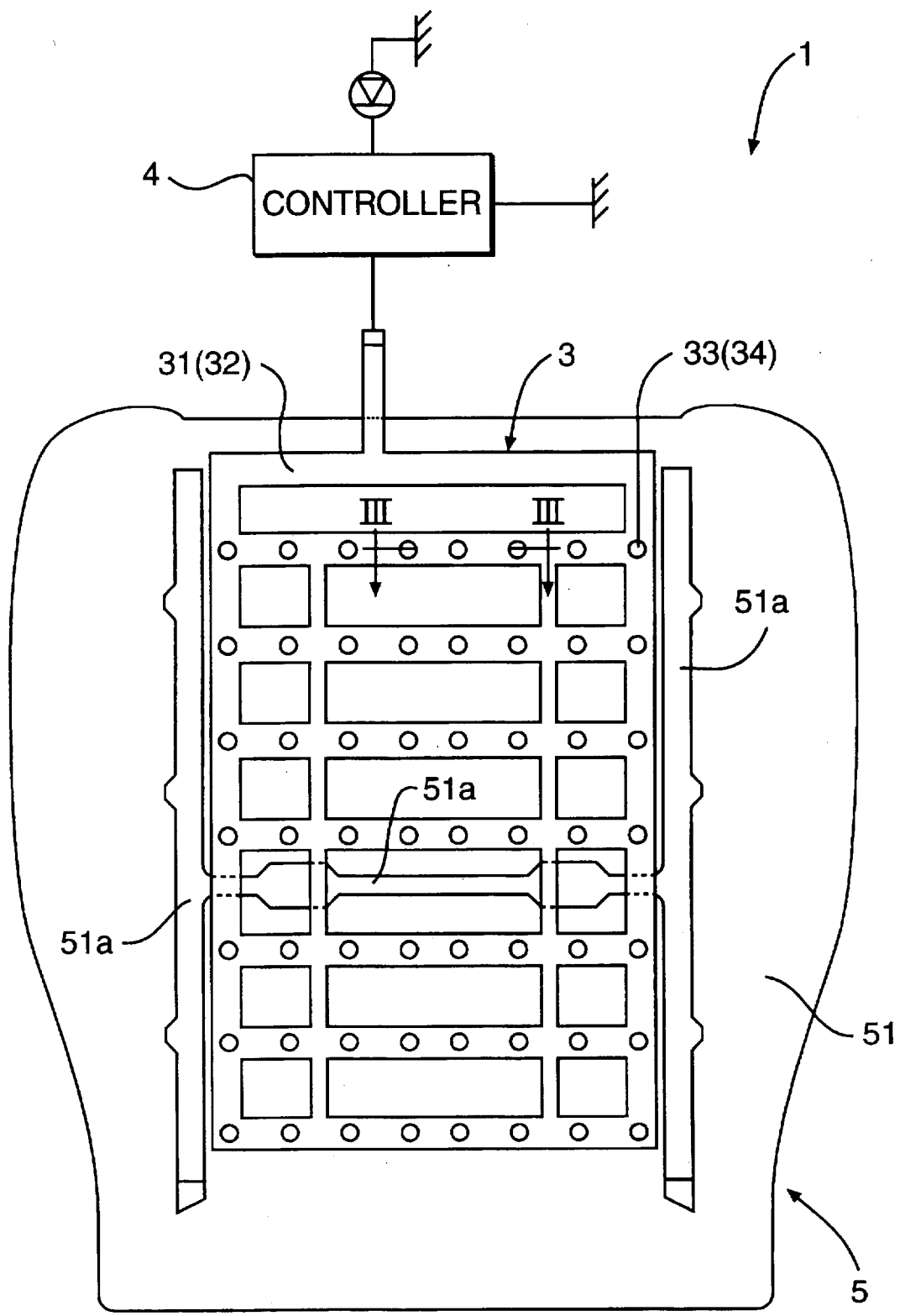
FIG. 2 is a plan view of a pressure switch according to the present invention.
Figure 3:
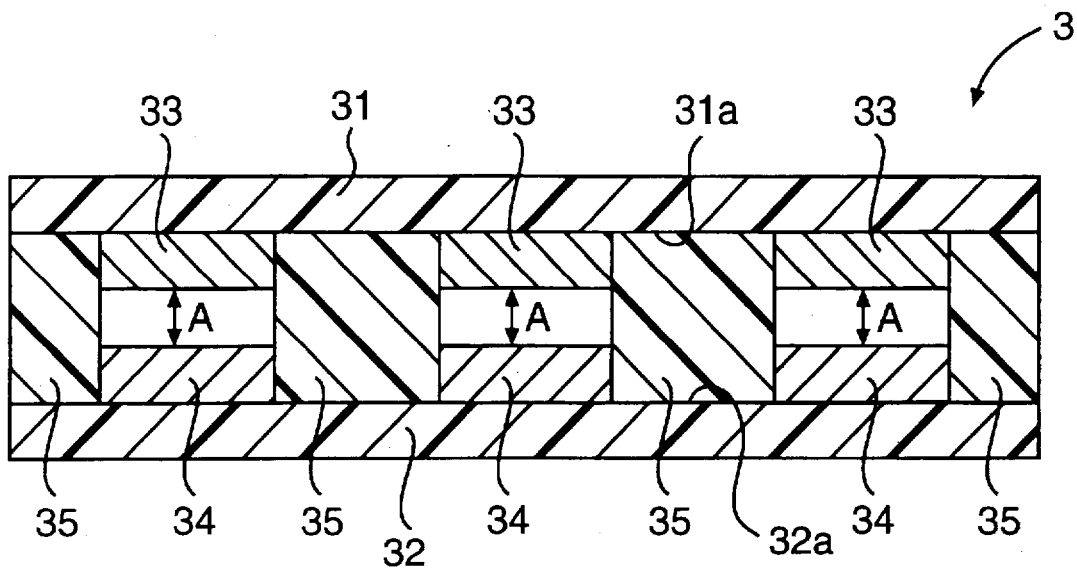
FIG. 3 is a cross-sectional view taken along line III—III in FIG. 2.

As shown in FIGS. 2 and 3, the pressure switch 3 includes a pair of films 31, 32 and a plurality of electrode pairs 33, 34. The films 31, 32 are made of resin material. Both films 31, 32 are formed in a lattice shape and are thin so as to be flexible. The film 31 is laminated onto the film 32 and the films 31, 32 are connected with a plurality of bond members 35. The electrodes 33, 34 are disposed between the films 31, 32 and spaced apart from each other. The plurality of electrodes 33 are printed onto an inner surface 31a of the film 31 which is bonded to an inner surface 32a of the film 32. The plurality of electrodes 34 are printed onto the inner surface 32a of the film 32 which is bonded to the inner surface 31a of the film 31 so as to be able to contact the opposing plurality of electrodes 33. The plurality of bond members 35 are disposed between electrodes 33, 34 and adjacent electrodes 33, 34. The bond members 35 are bonded to the inner surface 31a of the film 31 and the inner surface 32a of the film 32 in order to define a distance A between the plurality of electrodes 33 and the plurality of electrodes 34. When the distance A is maintained, the pressure switch 3 is in an OFF condition. When at least one of the electrodes 33 contacts the opposing electrode 34, the pressure switch 3 is in an ON condition.

Figure 4:
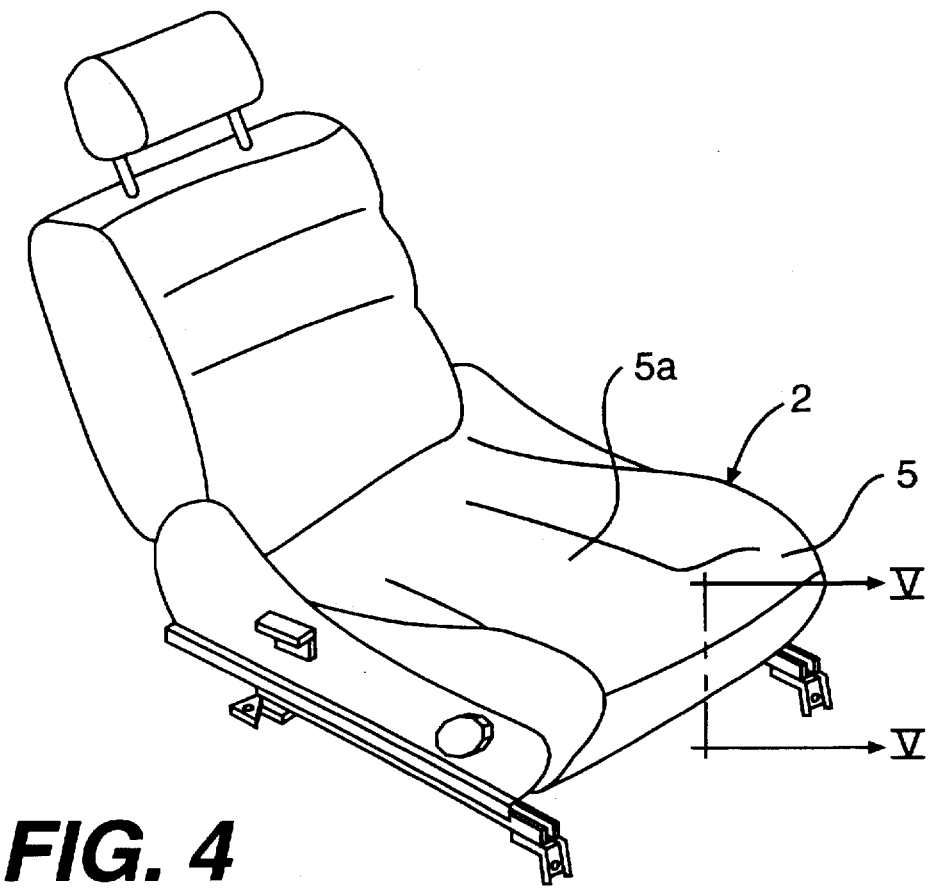
FIG. 4 is a perspective view of a seat incorporating the pressure switch according to the present invention.
Figure 5:
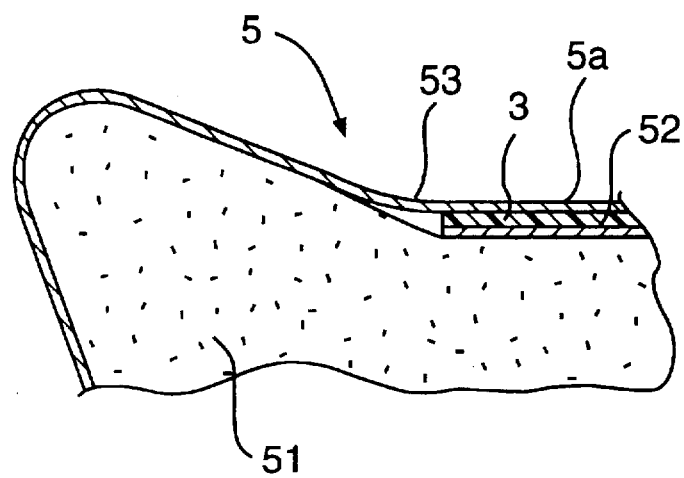
FIG. 5 is a cross-sectional view taken along line V—V in FIG. 4.

As shown in FIGS. 2, 4, and 5, the pressure switch 3 is arranged to cover a surface 5a of the seat cushion 5 of the seat 2 where the occupant is to be seated. The pressure switch 3 is fixed to the pad 51 of the seat cushion 5 by a bond layer 52 and covered by a cover 53 of the seat cushion 5. The cover 53 is attached to the pad 51 by a groove portion 51a which is formed in the seated surface 5a to avoid the pressure switch 3. The lattice shape of the pressure switch 3 is useful for engaging the cover 53 and avoiding the groove portion 51a. The pressure switch 3 may be fixed to the cover 53 instead of being fixed to the pad 51.

As shown in FIG. 1, the controller 4 is connected to the pressure switch 3 and a light emitter 6. The controller 4 includes a comparison circuit 41. The plurality of electrodes 34 are connected in parallel to a power supply voltage of the controller 4 through an output terminal 45. The plurality of electrodes 33 are connected in parallel to the comparison circuit 41 through an input terminal 42. The light emitter 6 is connected to the comparison circuit 41 through an output terminal 43. The comparison circuit 41 determines whether the pressure switch 3 is in an ON condition or in an OFF condition in accordance with an applied voltage at the input terminal 42. Therefore, the comparison circuit 41 determines whether the seat 2 is occupied in accordance with the ON condition or OFF condition of the pressure switch 3.

When a person is not seated on the seat 2, a load is not applied to the seat cushion 5 of the seat 2. The distance A between the electrodes 33, 34 of the pressure switch 3 is maintained so as not to cause contact between the plurality of electrode pairs 33, 34. Therefore, the comparison circuit 41 of the controller 4 determines the OFF condition of the pressure switch 3 and determines an unseated condition of the seat 2. The applied voltage input to the comparison circuit 41 through the input terminal 42 is lower than a predetermined base voltage which is set in the comparison circuit 41. As a result, the comparison circuit 41 outputs the unseated condition signal to the output terminal 43. The light emitter 6 is not lit in accordance with the unseated condition signal from the comparison circuit 41.

When a person is seated on the seat 2, a load is applied to the seat cushion 5 of the seat 2. At least one of the electrodes 33 contacts the opposing electrode 34 so as to conduct electricity between the electrodes 33, 34. Therefore, the comparison circuit 41 of the controller 4 determines the ON condition of the pressure switch 3 and determines a seated condition of the seat 2. The applied voltage input to the comparison circuit 41 through the input terminal 42 is higher than the predetermined base voltage which is set in the comparison circuit 41. As a result, the comparison circuit 41 outputs the seated condition signal to the output terminal 43. The light emitter 6 is lit in accordance with the seated condition signal from the comparison circuit 41.

Figure 6:
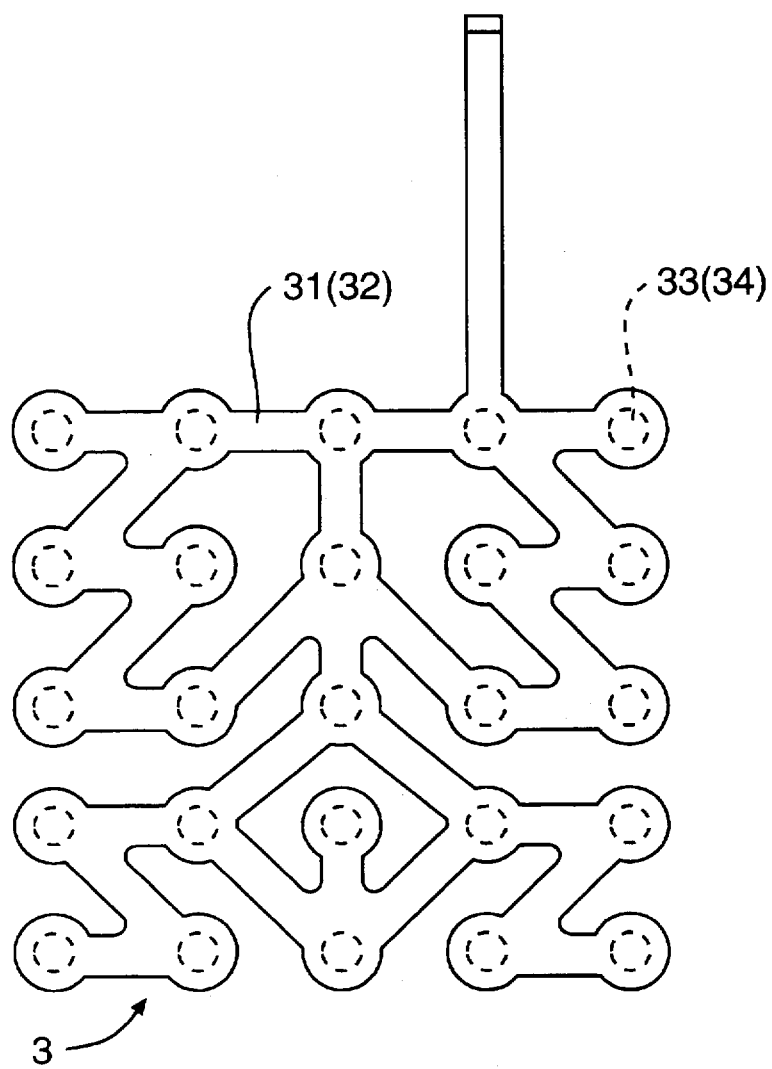
FIG. 6 is a plan view of an alternate embodiment of the pressure switch according to the present invention.

The pressure switch 3 is flexible as a whole, because the pressure switch 3 is made of the films 31, 32. Therefore, when the load is applied to the seat cushion 5 of the seat 2, the pressure switch deforms in response to a deformation of the pad 51 of the seat cushion 5. As shown in FIG. 6, the pressure switch 3 is formed in a tree shape so as to branch over the seated surface 5a of the seat cushion 5.

Figure 7:
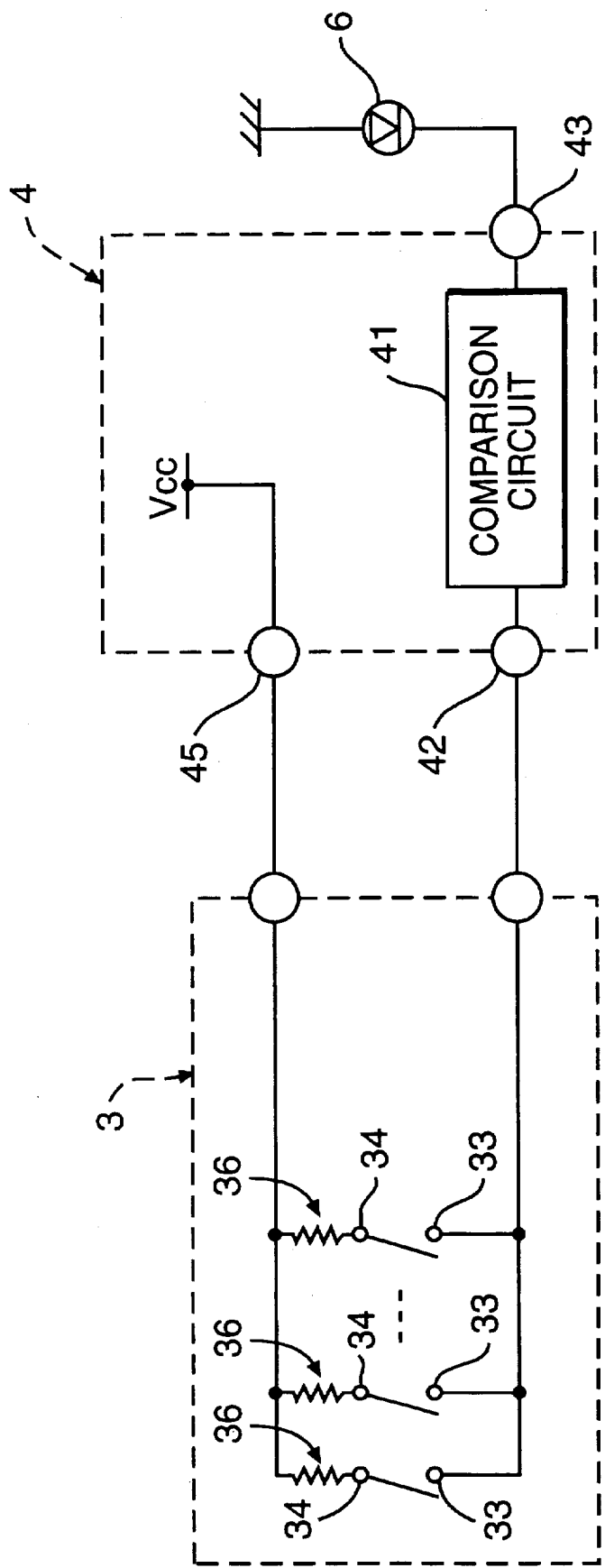
FIG. 7 is a circuit diagram of an alternate embodiment of electrical components of the present invention.

As shown in FIG. 7, the plurality of electrodes 34 are connected to the output terminal 45 through respective resistance members 36. The controller 4 determines the ON condition of the pressure switch 3 in accordance with the contact of at least one of the plurality of electrode pairs 33, 34.

Figure 8:
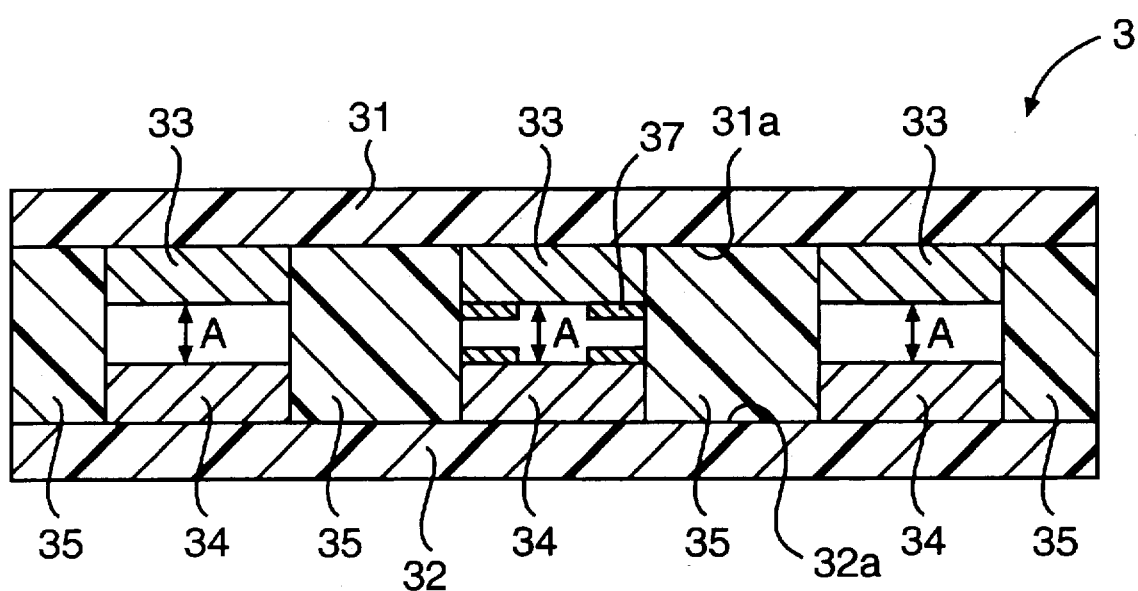
FIG. 8 is a cross-sectional view of another alternate embodiment of the pressure switch according to the present invention.

As shown in FIG. 8, an intervening member 37 is disposed between the electrodes 33, 34. Therefore, the force required for contact between the electrodes 33, 34 can be increased.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An occupant sensing apparatus for detecting whether an occupant is seated on a seat, comprising:

a pressure switch disposed in the seat, the pressure switch including a pair of films which are opposite to each other, a plurality of first electrodes which are disposed on one of the films and electrically connected to each other, a plurality of second electrodes which are disposed on the other of the films and electrically connected to each other and each of which is positioned opposite to a separate one of the first electrodes, and a spacer disposed between the films such that each of the first electrodes is maintained separate from each of the second electrodes when the seat is unoccupied; and a controller electrically connected to the first electrodes and the second electrodes and determining whether the seat is occupied in accordance with whether there has been contact of a first electrode and a second electrode positioned opposite thereto; and wherein the films are arranged in a plurality of branches, the one film in each branch including at least one of the plurality of first electrodes, and the other film in each branch including at least one of the plurality of second electrodes positioned opposite to the at least one of the plurality of first electrodes.

2. The occupant sensing apparatus according to claim 1, wherein the pressure switch deforms in response to a deformation of the seat.

3. The occupant sensing apparatus according to claim 1 wherein the plurality of branches are in the general shape of a lattice.

4. An occupant sensing apparatus for detecting whether an occupant is seated on a seat, comprising:

a pressure switch disposed in the seat, the pressure switch including a pair of films and a plurality of pairs of electrodes disposed between the films and spaced apart from each other so as to define an OFF condition of the pressure switch, with the pressure switch being in an ON condition when the electrodes contact each other; and a controller connected to the electrodes of the pressure switch and determining whether the seat is occupied in accordance with the ON or OFF condition of the pressure switch; and wherein the plurality of pairs of electrodes are connected together in parallel to the controller.

5. An occupant sensing apparatus for detecting whether an occupant is seated on a seat, comprising:

a pressure switch disposed in the seat, the pressure switch including a pair of films which are opposite to each other, a plurality of first electrodes which are printed onto the inner surface of one of the films and electrically connected to each other, a plurality of second electrodes which are printed onto the inner surface of the other of the films and electrically connected to each other and each of which is positioned opposite to a separate one of the first electrodes, and a spacer disposed between the films such that each of the first electrodes is maintained separate from each of the second electrodes when the seat is unoccupied; and a controller electrically connected to the first electrodes and the second electrodes and determining whether the seat is occupied in accordance with whether there has been contact of a first electrode and a second electrode positioned opposite thereto; and wherein the films are arranged in a plurality of branches, the one film in each branch including at least one of the plurality of first electrodes, and the other film in each branch including at least one of the plurality of second electrodes positioned opposite to the at least one of the plurality of first electrodes.

6. The occupant sensing apparatus according to claim 5, wherein the pressure switch deforms to an ON condition in response to deformation of the seat.

7. An occupant sensing apparatus for detecting whether an occupant is seated on a seat, comprising:

a pressure switch disposed in the seat, the pressure switch including a pair of films and at least two electrodes printed onto the inner surface of each film forming a plurality of electrode pairs spaced apart from each other to define an OFF condition of the pressure switch, the electrodes being movable to contact each other to establish an ON condition of the pressure switch; and a controller connected to the electrodes of the pressure switch and determining whether the seat is occupied in accordance with the ON or OFF condition of the pressure switch; and wherein the plurality of pairs of electrodes are connected in parallel to the controller.

8. An occupant sensing apparatus for detecting whether an occupant is seated on a seat, comprising:

a pressure switch disposed in the seat, the pressure switch including a pair of films which are opposite to each other, a plurality of first electrodes which are disposed on one of the films and electrically connected to each other, a plurality of second electrodes which are disposed on the other of the films and electrically connected to each other and each of which is positioned opposite to a separate one of the first electrodes, and a bond member disposed between the films such that each of the first electrodes is maintained separate from each of the second electrodes when the seat is unoccupied; and a controller electrically connected to the first electrodes and the second electrodes and determining whether the seat is occupied in accordance with whether there has been contact of a first electrode and a second electrode positioned opposite thereto; and wherein the films are arranged in a plurality of branches, the one film in each branch including at least one of the plurality of first electrodes, and the other film in each branch including at least one of the plurality of second electrodes positioned opposite to the at least one of the plurality of first electrodes.

9. The occupant sensing apparatus according to claim 8, wherein the pressure switch deforms to an ON condition in response to deformation of the seat.

10. An occupant sensing apparatus for detecting whether an occupant is seated on a seat, comprising:

a pressure switch disposed in the seat, the pressure switch including a pair of films and a plurality of pairs of electrodes disposed between the films and spaced apart from each other by a plurality of bond members so as to define an OFF condition of the pressure switch, the electrodes being movable by compression of the bond members to contact each other to establish an ON condition of the pressure switch; and a controller connected to the electrodes of the pressure switch and determining whether the seat is occupied in accordance with the ON or OFF condition of the pressure switch; and wherein the plurality of pairs of electrodes are connected in parallel to the controller.

11. An occupant sensing apparatus for detecting whether an occupant is seated on a seat, comprising:

a pressure switch disposed in the seat, the pressure switch including a pair of films and a plurality of pairs of electrodes disposed between the films and spaced apart from each other by a plurality of bond members so as to define an OFF condition of the pressure switch, the electrodes being movable by compression of the bond members to contact each other to establish an ON condition of the pressure switch; and a controller connected to the electrodes of the pressure switch and determining whether the seat is occupied in accordance with the ON or OFF condition of the pressure switch; and wherein the plurality of pairs of electrodes are connected in parallel to the controller and the plurality of bond members are disposed between electrode pairs and adjacent electrode pairs.

* * * * *